Figure 1:
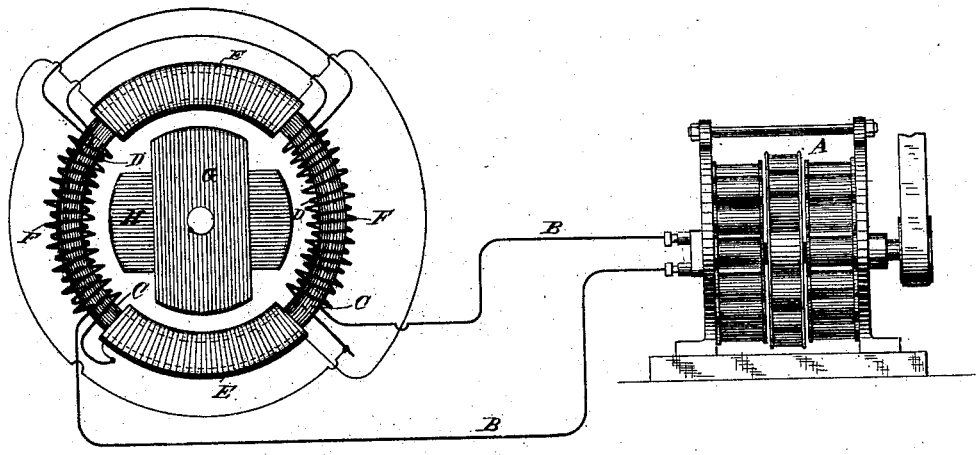

(No Model.)

N. TESLA.
ALTERNATING MOTOR.

No. 555,190. Patented Feb. 25, 1896.

Witnesses:
Raphael Netter
Robt F. Gaylord

Inventor
Nikola Tesla
by Duncan, Curtis & Page
Attorneys.

UNITED STATES PATENT OFFICE.

NIKOLA TESLA, OF NEW YORK, N. Y., ASSIGNOR TO THE TESLA ELECTRIC COMPANY, OF SAME PLACE.

ALTERNATING MOTOR.

SPECIFICATION forming part of Letters Patent No. 555,190, dated February 25, 1896.

Application filed May 15, 1888. Serial No. 273,993. (No model.)

*To all whom it may concern:*

Be it known that I, NIKOLA TESLA, a citizen of the United States, residing at New York, in the county and State of New York, have invented certain new and useful Improvements in Electromagnetic Motors, of which the following is a specification, reference being had to the drawings accompanying and forming a part of the same.

In former patents granted to me—notably, Patents Nos. 381,968 and 382,280, of May 1, 1888—I have shown and described a system for the electrical transmission of power characterized by the following particulars: The motor contains independent energizing-circuits and the generator has corresponding induced or current-generating circuits which are connected by independent line-circuits with those of the motor, the said circuits being independent in the sense only that the distinctive relations of the currents produced, transmitted and utilized in each are preserved to produce their proper conjoint effect. The disposition of the generator coils or circuits is such that the currents developed therein and transmitted therefrom to the motor will have a certain difference of phase—for example, so that the maximum periods of the currents generated in one of such circuits coincide with the minimum periods of the currents produced in the other circuit, and the corresponding energizing-circuits of the motor are so arranged that the two currents cooperate to effect a progressive shifting of the magnetic poles or the points of maximum magnetic effect in the motor, in consequence of which a rotation of its movable element is maintained.

My present invention pertains to this system of electrical transmission of power, its novel and distinguishing feature, however, being a special means for generating or producing in the two motor-circuits the alternating current necessary for the operation of the motor, for while in the instances referred to I produce both currents directly by a magneto-electric machine in the present instance I generate or produce in but one of the circuits of the motor directly an alternating current, and by means of such current induce in the other energizing-motor circuit the other alternating current necessary for its operation.

When the two currents are both produced in the magneto-electric machine, it will be observed that the two line or transmitting circuits will of necessity extend the entire distance from the generator to the motor; but by the plan herein provided one line-circuit only is required, as the circuit from the generator and the other are brought into inductive relation to each other in the motor itself.

The following is illustrative of a means by which I secure this result in accordance with my present invention: I employ as a motor, for example, a subdivided annular field-magnet within which is mounted a suitable armature, as a cylinder or disk, wound with two coils at right angles, each of which forms a closed circuit. On opposite sides of the annular field-magnet I wind two coils of insulated wire of a size adapted to carry the current from the generator. Over these coils, or close to them, in any of the well-understood ways, I wind secondary coils. I also wind on the annular field-magnet midway between the first-mentioned coils a pair of coils which I connect up in circuit with the secondary coils.

The last pair of coils I make of finer wire than the main or line and secondary coils, and with a greater number of convolutions, that they may have a greater relative magnetizing effect than either of the others.

By connecting up the main coils in circuit with a generator of alternating currents, the armature of the motor will be rotated. I have assumed that this action is explained by the following theory: A current-impulse on the line passing through the main coils establishes the magnetic poles of the annular field-magnet at points midway between said coils; but this impulse produces in the secondary coils a current differing in phase from the first, which, circulating through the second pair of energizing-coils, tends to establish the pole at points ninety degrees removed from their first position, with the result of producing a movement or shifting of the poles in obedience to the combined magnetizing effect of the two sets of coils. This shifting, continued by each successive current-impulse, establishes what may be termed a "rotary effort," and operates to maintain the armature in rotation.

Figure 2:
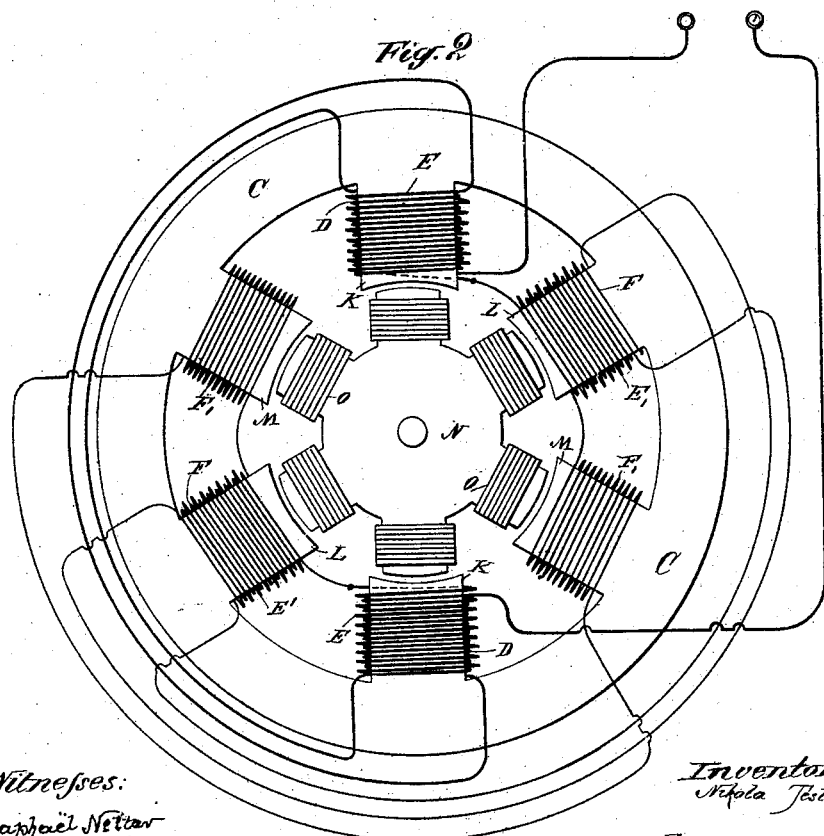

In the drawings annexed I have shown, in Figure 1, an alternating-current generator connected with a motor shown diagrammatically and constructed in accordance with my invention, and in Fig. 2 a diagram of a modified form of motor.

A designates any ordinary form of alternating-current generator, and B B the line-wires for connecting the same with the motor.

C is the annular field-magnet of the motor.

D D are two main coils wound on opposite sides of the ring or annular field and connected up with the line and having a tendency to magnify the ring C with opposite poles midway between the two coils.

E E are two other magnetizing-coils wound midway between the coils D D, but having a stronger magnetizing influence for a current of given strength than coils D D.

F F are the secondary coils, which are associated with the main coils D D. They are in circuits which include the coils E E, respectively, the connections being made in such order that currents induced in coils F and circulating in coils E will act in opposition to those in coils E in so far only as the location of the magnetic poles in the ring C is concerned.

The armature may be of any of the forms used by me in my alternating-current system, and is shown as wound with two closed coils G H at right angles to each other.

In order to prolong the magnetizing effect of the induced currents in producing a shifting of the poles, I have carried the principle of the construction exhibited in Fig. 1 further, thereby obtaining a stronger and better rotary effect.

Referring to Fig. 2, C is an annular field-magnet having three pairs or oppositely-located sets of polar projections K L M. Upon one pair of these projections, as K, the main energizing-coils D are wound. Over these are wound the secondary coils E. On the next polar projections L L are wound the second energizing-coils F, which are in circuit with coils E. Tertiary-induced coils E' are then wound over the coils F, and on the remaining polar projections M the third energizing-coils F' are wound and connected up in the circuit of the tertiary coils E'.

The cylindrical or disk armature core N in this motor has polar projections wound with coils O, forming closed circuits. My object in constructing the motor in this way is to effect more perfectly the shifting of the points of maximum magnetic effect. For, assuming the operation of the motor to be due to the action above set forth, the first effect of a current-impulse in this motor will be to magnetize the pole-pieces K K; but the current thereby induced in coils E magnetizes the pole-pieces L, and the current induced in turn in coils E' magnetizes the pole-pieces M. The pole-pieces are not magnetized, at least to their full extent, simultaneously by this means; but there is enough of a retardation or delay to produce a rotary effect or influence upon the armature. The application of this principle is not limited to the special forms of motor herein shown, as any of the double-circuit alternating-current motors invented by me and described in former Letters Patent to me may be adapted to the same purpose.

This invention, moreover, is not limited to the specific means herein shown for inducing in one energizing-circuit of the motor the currents necessary for co-operating with the primary current of the generator for producing the progressive shifting of the poles or points of maximum magnetic effect.

I believe that I am the first to produce any kind of a motor adapted to be operated by alternating currents and characterized by any arrangement of independent circuits brought into inductive relation so as to produce a rotary effort or effect due to the conjoint action of alternating currents from a source of supply in one of the motor-circuits and alternating currents induced by the first-named currents in the other circuit, and this without reference to the specific character or arrangement of the said two circuits in the motor.

What I therefore claim as my invention is—

1. In an electromagnetic motor, the combination of independent energizing-circuits, one adapted to be connected with a source of alternating current, the other arranged in inductive relation to the said first circuit whereby the motor will be operated by the resultant action of the two circuits, as set forth.

2. The combination in an electromagnetic motor, with an alternating coil or conductor and a closed-circuit conductor in inductive relation thereto, of an armature mounted so as to be within the field produced by the coil and closed conductor, as set forth.

3. The combination in an electromagnetic motor, with energizing-coils adapted to be connected with the generator of induced coils and independent energizing-coils in circuit therewith and arranged to produce a shifting movement of the points of maximum magnetic effect of the motor, as set forth.

4. The combination in an electromagnetic motor of a series of independent energizing-coils or sets of coils and induced coils wound on all the energizing-coils or sets of coils but the last of the series, the first energizing-coil or set of coils being included in circuit with a generator and each succeeding energizing-coil or set of coils being in circuit with the induced coils of the next preceding energizing-coils of the series.

5. In a system for the electrical transmission of power the combination of an alternating-current generator, a motor with an energizing coil or coils connected with the generator, secondary coils in inductive relation to said energizing-coils, and energizing-coils in circuit therewith arranged in substantially the manner set forth to produce a movement or rotation of the points of maximum magnetic effect of the motor, as set forth.

6. In an electromagnetic motor the combination of independent energizing-circuits, one for connection with a source of alternating currents, the other in inductive relation to the first, whereby a rotary movement or projection of the field-poles will be produced by the conjoint action of the two and an armature mounted within the influence of the field produced by the energizing-circuits and containing closed coils or circuits, as set forth.

NIKOLA TESLA.

Witnesses:
 ROBT. F. GAYLORD,
 FRANK E. HARTLEY.